(12) United States Patent
Epstein

(10) Patent No.: US 7,054,348 B2
(45) Date of Patent: May 30, 2006

(54) USING REAL RANDOM NUMBER GENERATOR AS PROOF OF TIME

(75) Inventor: Michael A. Epstein, Spring Valley, NY (US)

(73) Assignee: Koninklijke Philips Electronic N.V., Eindhoven (NL)

( * ) Notice: Subject to any disclaimer, the term of this patent is extended or adjusted under 35 U.S.C. 154(b) by 756 days.

(21) Appl. No.: 10/011,217

(22) Filed: Nov. 15, 2001

(65) Prior Publication Data

US 2003/0091094 A1  May 15, 2003

(51) Int. Cl.
*H04B 1/69* (2006.01)

(52) U.S. Cl. ............ 375/130; 375/219; 375/221; 375/228; 714/715; 714/739; 380/268; 705/400

(58) Field of Classification Search ........... 375/130, 375/340, 367, 219, 221, 228; 380/34, 201, 380/268; 705/14, 401, 400; 714/716, 715, 714/739

See application file for complete search history.

(56) References Cited

U.S. PATENT DOCUMENTS

| | | | | |
|---|---|---|---|---|
| 4,231,113 A | * | 10/1980 | Blasbalg | 380/34 |
| 4,237,537 A | * | 12/1980 | Pitches et al. | 705/401 |
| 4,853,884 A | | 8/1989 | Brown et al. | 708/3 |
| 5,144,313 A | * | 9/1992 | Kirknes | 342/44 |
| 5,272,705 A | * | 12/1993 | Okamoto | 714/716 |
| 5,781,458 A | | 7/1998 | Gilley | 708/255 |
| 6,631,390 B1 | | 10/2003 | Epstein | |
| 2003/0033657 A1 | | 10/2001 | Lipton et al. | 380/201 |

FOREIGN PATENT DOCUMENTS

| | | |
|---|---|---|
| GB | 0031607.5 | 12/2000 |
| WO | WO0059250 | 5/2000 |

OTHER PUBLICATIONS

M. Epstein et al. "Design and Implentation of a True Random Number Generator Based on Digital Circuit Artifacts" pp. 1-14.

* cited by examiner

Primary Examiner—Stephen Chin
Assistant Examiner—Ted M. Wang
(74) Attorney, Agent, or Firm—Larry Liberchuk

(57) ABSTRACT

A truly random sequence of bits is transmitted from a transmitter, such that a receiver can receive and store a portion of the transmission for the duration of time that the receiver is within range of the transmitter. Thereafter, the stored sequence in the receiver is compared to a stored copy of the continuous transmission to determine the time that the stored sequence was transmitted. If the sequence of bits is truly random, the security of the system is assured.

12 Claims, 1 Drawing Sheet

USING REAL RANDOM NUMBER GENERATOR AS PROOF OF TIME

BACKGROUND OF THE INVENTION

1. Field of the Invention

This invention relates to the field of electronic devices, and in particular to a system and method for verifying a time, or time duration, based on a random number generator.

2. Description of Related Art

A number of systems or methods are configured to be dependent upon whether an event happens at a particular time, or within a particular time duration, or for a particular time duration. For example, workers often 'punch-in' via a time-clock, and 'punch-out' some time later. The workers' wages are based on the time between punch-in and punch-out. In like manner, an occupancy fee, or entertainment fee, may be imposed based upon the time that a user remains at a particular locale. Or, a bonus fee may be paid to a user based upon the time that the user remains at a locale. In like manner, a bonus or penalty may be associated with a person's arrival or departure from a locale at a particular time of day.

When awards or penalties are associated with a time parameter, the risk exists that the time parameter will be tampered with, to increase the award, or decrease the penalty. Conventional "time-clocks" are configured to substantially reduce the risk of tampering.

Conventional time-clocks, however, are somewhat obtrusive, and inconvenient, particularly in this age of proximity detectors, wireless devices, and so on. A system based on an electronic time-clock, however, and particularly a time-clock or other time verification device that communicates wirelessly, is susceptible to a falsification of records, unless a secure encoding of each time-parameter, or select time-parameters, is used.

BRIEF SUMMARY OF THE INVENTION

It is an object of this invention to provide a secure method and system for verifying presence at a locale during a specific time period. It is a further object of this invention to provide a secure method and system for verifying receipt of information during a specific time period. It is a further object of this invention to provide a secure method and system for verifying presence at a locale in an unobtrusive manner.

These objects and others are achieved by continually transmitting a random sequence of bits from a transmitter, such that a receiver can receive and store a portion of the continuous transmission for the duration of time that the receiver is within range of the transmitter. Thereafter, the stored sequence in the receiver is compared to a stored copy of the continuous transmission to determine the time that the stored sequence was transmitted. If the sequence of bits is truly random, the security of the system is assured.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
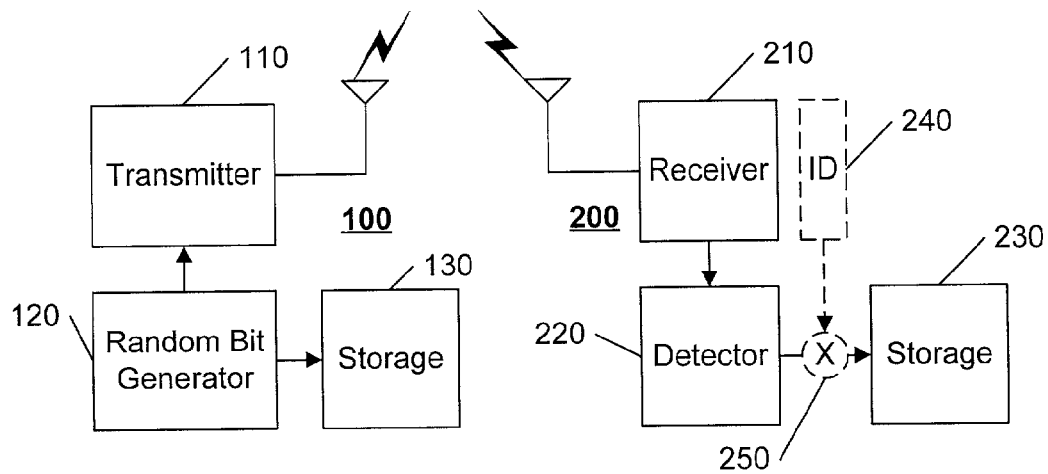
FIG. 1 illustrates an example block diagram of a time verification communication system in accordance with this invention.

Copending U.K. patent application "CREDIT SYSTEM AND METHOD", filed Dec. 27, 2000 for Paul Rankin, and having a common assignee to this invention, discloses the granting of credits, or debits, based upon being at a particular locale for a duration of time, and is incorporated by reference herein. In this copending application, a user is rewarded for spending time at a locale, such as a department store or shopping mall, to encourage the user to browse the merchandise available for sale. The user carries a portable device, such as a badge, a PDA, a bluetooth-enabled cell phone, and so on, that is configured to receive a transmission from a beacon that is located in the particular locale. The user continues to receive the transmission while within range of the beacon. Thereafter, the user presents a copy of the received transmission, or a composite based on the received transmission, to a verification system that is configured to determine and verify the time corresponding to the received transmission, and to issue a reward, or to charge a fee, based on the verified time.

In the copending application, a variety of techniques are disclosed for communicating information sufficient to determine whether the user was truly within the vicinity of the beacon. In a preferred embodiment, the beacon transmits a packet containing the current time, a sequence number, and a pseudo-random number. In an environment of multiple beacons, each beacon is also configured to transmit a beacon identifier. The user device is configured to store the first received current time parameter, and the beacon identifier, and to accumulate a composite of the subsequent pseudo-random numbers that it receives from the same beacon, such as a running sum of the pseudo-random numbers. When the user device fails to receive a next-sequential transmission from the beacon, it stores the last received current time parameter and sequence number, and the composite of the pseudo-random numbers. Subsequent received sequences may be processed and stored similarly.

To collect the reward, the user communicates the one or more sequence summaries (starting and ending parameters, plus the composite) to a verification system. The verification system is configured to credit or debit a user's account for the time duration between the starting and ending sequence time, provided that the composite corresponds to a similarly determined composite of the transmitted sequence between the starting and ending sequence time.

In addition to the use of this copending invention to reward or charge a person for being in a particular locale, the copending application also notes that a similar broadcast can be provided by a cable providers to transmitting devices within a user's home, to reward users for listening or viewing particular programs.

This invention is intended to overcome potential security pitfalls in the above described copending invention, and to simplify the requirements for a user device.

As noted in the copending application, and as generally known, a pseudo-random sequence is only secure for a limited amount of time, and only as secure as the security measures employed to keep the 'seed' value of the sequence secret. Most, if not all, pseudo-random sequences can be predicted once a sufficiently long sequence of values from the pseudo-random sequence is collected. In the copending application, this security risk is avoided by resetting the seed that is used to initialize the sequence frequently, to avoid the transmission of a long sequence of values. However, the communication of this seed value to the transmitter to effect the frequent re-initialization is subject to a potential security breach. If the potential rewards from the system are high, knowledge of the seed values will be highly valuable.

In a preferred embodiment of this invention, a truly random sequence is used as the transmitted sequence. Any of a number of existing techniques may be used to provide a truly random sequence. U.S. Pat. No. 4,853,884, "RANDOM NUMBER GENERATOR WITH DIGITAL FEEDBACK", issued 1 Aug. 1989 to Brown et al, discloses a technique for generating a random number by reverse biasing a zener diode, and controlling the reverse bias to assure an approximate equal proportion of zeros and ones produced, and is incorporated by reference herein. U.S. Pat. No. 5,781,458, "METHOD AND APPARATUS FOR GENERATING TRULY RANDOM NUMBERS", issued 14 Jul. 1998 to Gilley, discloses an RC oscillating circuit, wherein a random sequence is generated based on a comparison of the periods of two sequential cycles, and is incorporated by reference herein. These and other techniques for generating a random sequence of bits based on random physical phenomena are common in the art.

FIG. 1 illustrates an example block diagram of a time verification communication system in accordance with this invention. The system includes a transmission system 100 and a receiving system 200. The transmission system 100 includes a transmitter 110 that is configured to transmit a signal that is based on an output of a random bit generator 120 that is configured to provide a truly random (i.e. unpredictable) sequence of bits. The receiving system 200 includes a receiver 210 and a detector 220 that are configured to receive and detect the sequence of truly random bits that are being transmitted, provided that the receiving system 200 is within range of the transmitting system 100. The detector 220 is further configured to store the received bits, or a composite of the received bits in a storage device 230.

Because the random bit generator 120 generates an unpredictable and indeterminable sequence of bits, the generated bits, or a composite of the generated bits, must be stored, for subsequent comparisons with a received sequence of bits from a receiving system 200. That is, in the aforementioned copending application, the use of a pseudo-random sequence of bits allows for a subsequent regeneration of the sequence from the initialization seed, as needed, to verify a received sequence. In this invention, however, it is virtually impossible to regenerate the truly random sequence, and thus the generated sequence, or a composite of the generated sequence, must be stored. As illustrated in FIG. 1, the sequence is preferably stored at a storage device 130 at the transmitter 100; however, it may be stored at another receiving device that is known to be reliably within range of the transmitter 100.

The random sequence may be transmitted using any of the techniques disclosed in the referenced copending application, including the use of the conventional Bluetooth communications scheme for communicating with wireless devices. The verification techniques disclosed in the referenced copending application, generally based on the communication of an explicit time parameter, as discussed above, may also be used for verifying the received sequence, except that the comparison will be to the stored generated sequence, or a composite of the generated sequence, as noted above.

Hereinafter, alternative methods and techniques for communicating and verifying a random sequence are presented.

Figure 2:
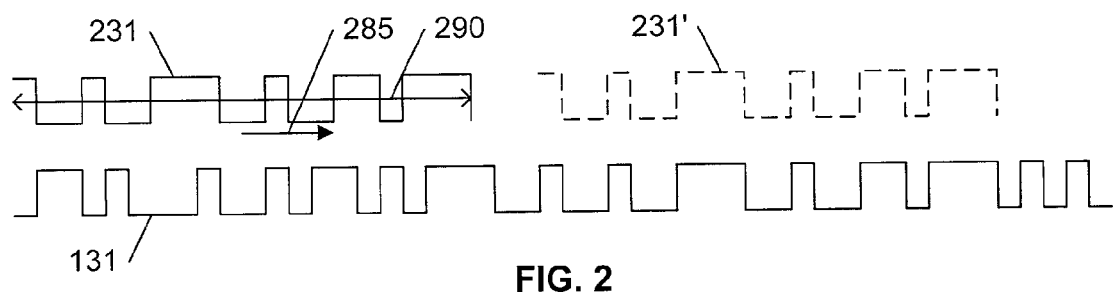
FIG. 2 illustrates an example pattern comparison in a time verification system in accordance with this invention.

FIG. 2 illustrates an example comparison of a received sequence 231 (from the storage 230 in the receiver 200 of FIG. 1) to a transmitted sequence 131 (from the storage 130 of the transmitter 100 of FIG. 1) in a time verification system in accordance with this invention. Assuming that the bits in the sequence are transmitted at regular time intervals, the duration of time that the receiving system 200 was in the vicinity of the transmitting system 100 is determined by the length 290 of the received sequence 231. To determine the time corresponding to the transmission of the received sequence 231, and to verify that the particular sequence 231 was transmitted by the transmitting system 100, the received sequence 231 is shifted relative to the transmitted sequence 131 until there is a one-to-one correspondence between the sequences 231, 131, as illustrated by the dashed sequence 231' in FIG. 2.

As would be evident to one of ordinary skill in the art, the number of bits in the received sequence determines the likelihood of a false verification of a given received sequence 231. A bogus sequence could coincidently match a segment of the transmitted sequence 131, but the likelihood of such a coincidence decreases in half with each additional bit in the sequence. Because the typical application of this invention is a system that credits or debits a user in proportion to the time spent within range of the transmitting system, the 'cost' of a mistaken verification of a short sequence is relatively insignificant. Alternatively, consistent with the teachings of the copending application, an explicit time parameter may also be transmitted, thereby reducing the allowable range within the sequence 131 for determining a match, and increasing the efficiency of the search by a legitimate receiver and reducing the likelihood of finding a coincidentally matching sequence by an illicit receiver.

Figure 3:
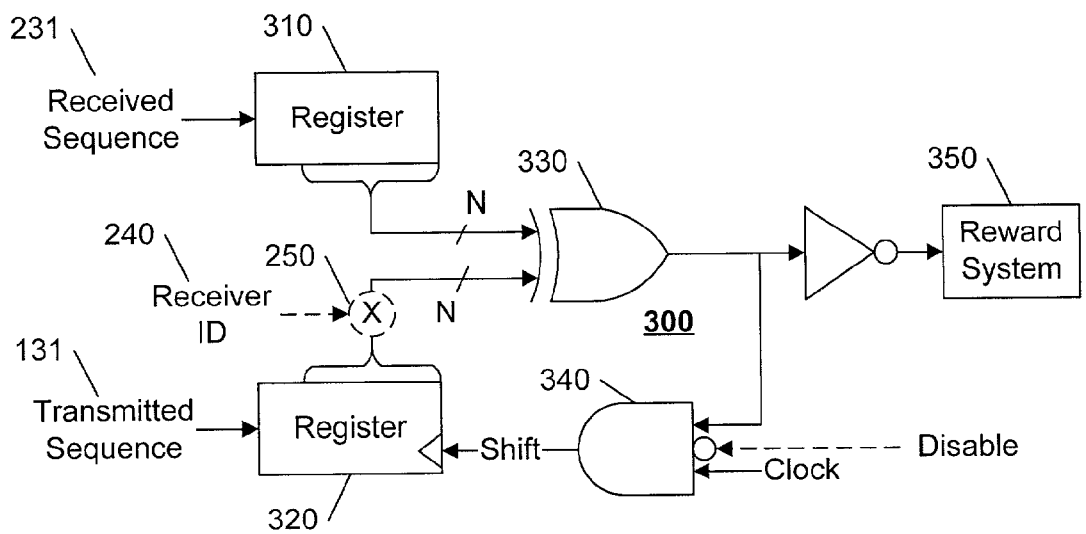
FIG. 3 illustrates an example block diagram of a comparison device in a time verification system in accordance with this invention.

FIG. 3 illustrates an example block diagram of a comparison device 300 in a time verification system in accordance with this invention. The device 300 includes registers 310, 320 for holding the received pattern 231 and the transmitted pattern 131, respectively. The maximum size of the registers 310, 320 is selected based on the expected maximum size of a received sequence 231, or based on a modulus of time for partitioning the verification process into manageable parts. The number of bits in the received pattern 231 may be less than, equal to, or greater than the number of available bit positions in the registers 310, 320. If the number of bits in the received sequence 231 is greater than the size of the registers 310, 320, the received sequence is partitioned into sequential subsets. That is, for example, if the sequence bit rate is one bit per second, the registers 310, 320 may be sixty bits wide, and each minute-long sequence in the received sequence 231 is processed and verified.

Illustrated in FIG. 3, the number of bits in the sequence, or in the subset of the sequence, N, are provided from each register 310, 320 to an exclusive-OR gate 330 that asserts a logic-high value if any of the corresponding bits from each register differ, indicating a non-match between the N-bit sequence in the register 310 and the N-bit sequence in the register 320. Typically, an N-bit exclusive-OR function is embodied as N two-input exclusive-OR gates followed by an OR function, or a Boolean equivalent, such as N two-input exclusive-NOR gates followed by an AND function.

If there is a non-match, the contents of the register 320 are shifted by one bit, via the clocking gate 340, or equivalent function, and the comparison 330 between the N-bit sequence in the register 310 and this shifted sequence in the register 320 is performed. This process continues until there is a match, or until the transmitted pattern 131 is exhausted. If there is a match, the reward system 350 receives a match signal and proceeds to issue the appropriate reward to the user associated with the receiver 200, or, in the case of multiple subsets of the received sequence 231, proceeds to accumulate a total of rewards for issue to the user.

If the N-bit sequence corresponds to a subset of the received sequence 231, and a match is determined, the next subset of the received sequence 231 is loaded into the register 310, and a corresponding number of bits of the transmitted sequence 131 are loaded into the register 320. Because the subsequent subset is purported to be a continuation of the prior subset, the subset in the register 310 should correspond to the subset in the register 320. Therefore, in a preferred embodiment, after a first match is found, the clocking gate 340 is disabled. Alternatively, to avoid the possibility that the first subset match is a coincidental match to a (prior) repeated pattern in the transmitted sequence 131, and would therefore cause all subsequent subsets to be rejected, the system 300 may be configured to allow the contents of the register 320 to be shifted to find subsequent subset matches. In such an embodiment, however, the subsets will continue to be processed sequentially, by not allowing the contents of the register 320 to be shifted in an opposite direction, thereby minimizing the likelihood of random coincidental matches substantially.

Illustrated in FIGS. 1 and 3 is an optional receiver ID 240, and mixer 250. These devices are provided to assure that the sequence submitted for verification was not merely copied from another receiving system. In accordance with this aspect of the invention, each receiving system 200 has an associated receiver ID 240. Using techniques common in the art, such as a one-way hashing function, the sequence from the detector 220 is combined at the mixer 250 in an irreversible manner with the receiver ID 240 before it is stored in the storage 230. Because the combination is irreversible, the pattern in the storage 230 cannot be used to determine the transmitted random bit pattern. Alternative means of binding a pattern of bits to a particular receiver will be evident to one of ordinary skill in the art in view of this disclosure.

At the verification system 300, of FIG. 3, the receiver ID 240 is presented when the received pattern 231 is presented for verification. The original transmitted random bit pattern 131 from the register 320 is combined with the receiver ID 240, using the same mixing process 250, before it is presented to the comparator 330. If the same receiver ID is used in the mixers 250 in the receiving system 200 and in the verification system 300, the output pattern of the mixer 250 in the verification system 300 will match the received pattern 231 from the storage 230 at the corresponding time that the random bit pattern was received.

Note that in a preferred embodiment of this invention, the bit rate of the transmitted sequence is relatively slow, thereby allowing for a very simple embodiment of the transmitting system 100 and the receiving system 200 of FIG. 1. In a straightforward embodiment, the transmitter 110 may be configured to transmit a continuous signal when the random bit is a one, and to not transmit when the random bit is a zero. Alternatively, the transmitter 110 may transmit at a first frequency when the bit is a one, and at a second frequency when the bit is a zero. These simple transmission schemes allows for a simple embodiment of a receiving system 200, the receiver merely being tuned to the appropriate frequency band, and the detector merely being a frequency-sensitive device. A relatively slow clock may be employed to sample the output of the detector to determine the value that is to be stored in the storage 230. Any of a variety of encoding schemes may be employed at the transmitter 110 to facilitate a relative synchronization of the transmitter bit period to the receiver bit period, such as the transmission of a pilot tone at the start of each new bit, the use of a return-to-zero (RZ) bit encoding scheme, or others. The relatively simple encoding scheme also allows for a variety of transmission schemes, including infrared and other low-cost transmitters and receivers. The use of an infrared transmission is particularly well suited for multi-beacon environments, such as shopping malls, due to the generally limited range of an infrared transmission. Conversely, relatively low-frequency RF transmissions, or high-frequency sonic transmissions, would be particularly well suited for large area environments, such as arenas and amusement parks. Accordingly, the modulation may be at a relatively low frequency relative to the carrier frequency of the transmitted signal that is received by the receiver.

The low information bit rate also facilitates other applications for this invention. For example, a broadcast from a radio or television station may include a modulation signal corresponding to the random bit stream, and a receiving system could be configured to detect this modulation when tuned to the particular broadcast. Rewards would be based on the time that the receiving device is tuned to the particular broadcast. Alternatively, the receiving system may subsequently re-transmit the random bit stream to a user's receiving system 200, using an infrared, RF, or sonic transmitter.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A transmission system comprising:
    a random bit generator that is configured to provide an unpredictable sequence of bits,
    a transmitter that is configured to communicate the unpredictable sequence of bits, and
    a storage device that is configured to store data corresponding to the unpredictable sequence of bits, to facilitate a verification of receipt of the unpredictable sequence of bits by a receiving system, the receiving system comprising a mixer that is configured to combine the unpredictable sequence of bits with an identifier of the receiving system to form the data corresponding to the unpredictable sequence of bits.

2. The transmission system of claim 1, wherein the transmitter includes at least one of:
    a radio-frequency transmitter,
    an infrared transmitter, and
    a sonic transmitter.

3. The transmission system of claim 1, wherein the unpredictable sequence of bits is communicated via at least one of:
    frequency modulation,
    on-off keying of a carrier signal,
    return-to-zero encoding, and
    a synchronizing pilot signal.

4. A receiving system comprising:
a receiver that is configured to receive a modulation corresponding to a random bit sequence
a detector that is configured to detect the random bit sequence from the modulation;
a storage device that is configured to store data corresponding to the random bit sequence, to facilitate a verification of receipt of the random bit sequence; and
a mixer that is configured to combine the random bit sequence with an identifier of the receiving system to form the data corresponding to the random bit sequence.

5. The receiving system of claim 4, wherein the receiver includes at least one of:
a radio-frequency receiver,
an infrared receiver, and
a sonic receiver.

6. The receiving system of claim 4, wherein the modulation includes at least one of:
frequency modulation,
on-off keying of a carrier signal,
return-to-zero encoding, and
a synchronizing pilot signal.

7. The receiving system of claim 4, wherein the mixer is configured to combine the random bit sequence with the identifier of the receiving system using an irreversible transform.

8. The receiving system of claim 4, wherein the modulation is at a relatively low frequency relative to a carrier frequency of a transmitted signal that is received by the receiver.

9. A verification system comprising:
a first register that is configured to contain received data;
a second register that is configured to contain at least a portion of transmitted data;
a comparator, operably coupled to the first register and the second register, that is configured to compare the received data to a select portion of the transmitted data;
a shift controller that is configured to shift the portion of transmitted data in the second register to provide a next select portion of the transmitted data for comparison, if the comparator indicates a difference between the received data and the select portion of the transmitted data; and
a reward system that is configured to provide a reward based on a length of the received data when the comparator indicates a match between the received data and the portion of the transmitted data.

10. The verification system comprising:
a first register that is configured to contain received data;
a second register that is configured to contain at least a portion of transmitted data;
a comparator, operably coupled to the first register and the second register, that is configured to compare the received data to a select portion of the transmitted data;
a shift controller that is configured to shift the portion of transmitted data in the second register to provide a next select portion of the transmitted data for comparison, if the comparator indicates a difference between the received data and the select portion of the transmitted data; and
a mixer, operably coupled to the second register and the comparator, that is configured to combine at least a part of the portion of the transmitted data with an identifier of a receiver to produce the select portion of the transmitted data that is compared to the received data.

11. A method of providing a reward for being at a particular locale, comprising:
transmitting an unpredictable sequence of bits from a transmitter at the particular locale,
storing transmission data corresponding to the unpredictable sequence of bits,
receiving at least a portion of the unpredictable sequence of bits at a receiver when the receiving system is within receiving range of the transmitter,
storing reception data corresponding to the portion of the unpredictable sequence of bits at the receiving system,
subsequently comparing the reception data to the transmission data to identify a period of correspondence between the reception data and the transmission data, and
determining the reward based on the period of correspondence.

12. The method of claim 11, wherein comparing the reception data to the transmission data includes:
partitioning the reception data into a plurality of subsets of reception data, and
comparing each subset of the plurality of subsets of reception data to a corresponding subset of the transmission data.

* * * * *